March 14, 1961    M. G. JACOBSON    2,975,362
SEMICONDUCTOR DIODES FOR GAS DETECTION
Filed May 6, 1957                           2 Sheets-Sheet 2

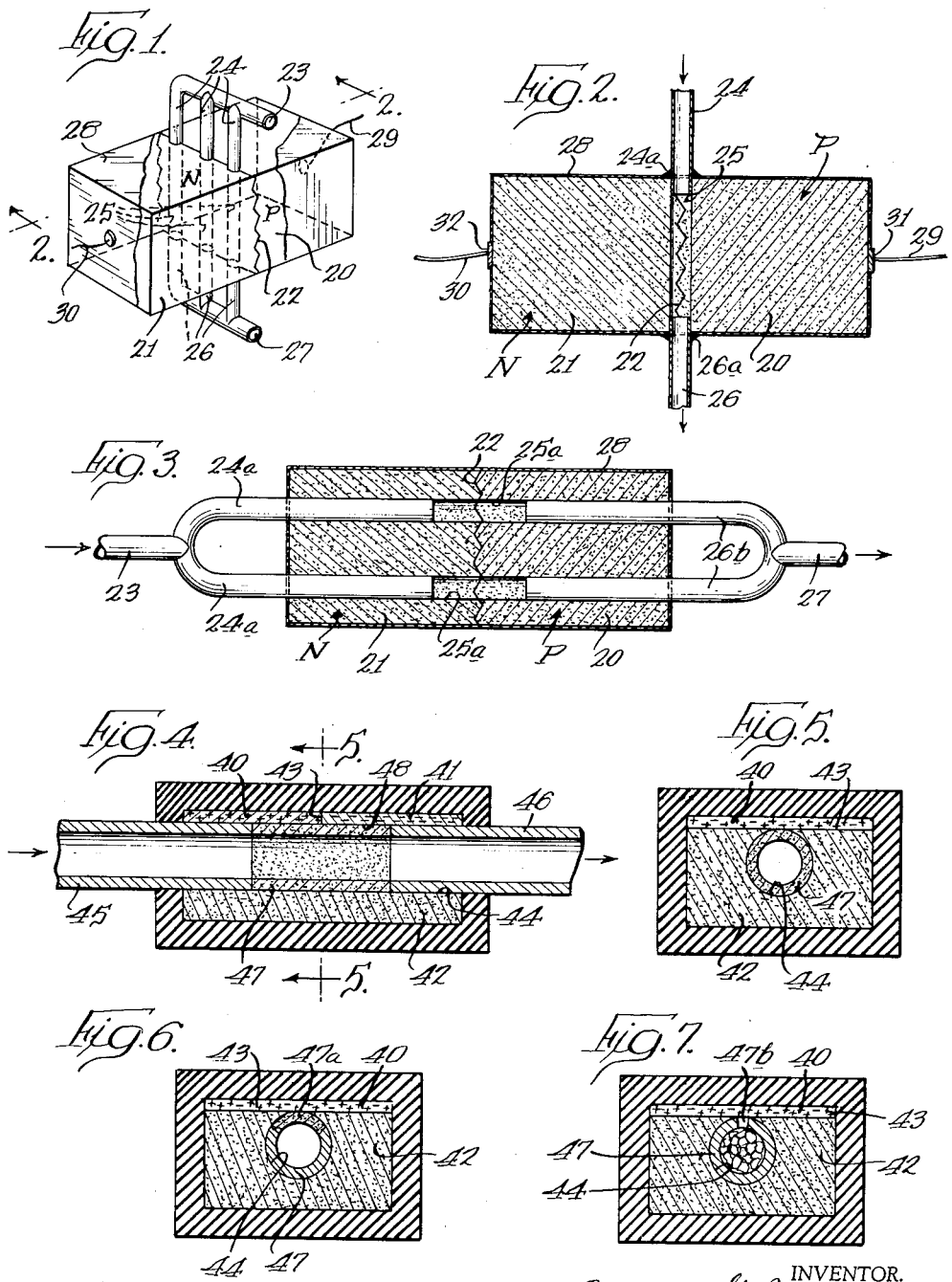

INVENTOR.
Moses G. Jacobson
BY
Mason, Kolehmainen, Rathburn & Wyss
Attys.

2,975,362

SEMICONDUCTOR DIODES FOR GAS DETECTION

Moses G. Jacobson, Penn Township, Allegheny County, Pa., assignor to Mine Safety Appliances Company, Pittsburgh, Pa., a corporation of Pennsylvania Filed May 6, 1957, Ser. No. 657,343

30 Claims. (Cl. 324—71)

The present invention relates generally to fluid detecting devices and, more specifically, to improved semiconductor type rectifiers or diodes for use in fluid detectors, particularly in light, portable gas detecting apparatus.

It has been known for some time that certain electrical properies of semi-conductors are changed when their surface is exposed to certain gases and vapors such as, for example, oxygen, ozone, water vapor, alcohol vapor, and others. The various particles and gases that have been found to have an effect on the electrical characteristics of a semiconductor material are referred to herein generically as containing "electrically reactive particles," it being understood that this term includes ions, polar molecules, charged particles, easily polarized and easily ionizable molecules and atoms. Also, the electrical characteristics of a semiconductor which may be affected by such particles are surface potential, charge density, conductivity, work function, Fermi levels of electrons or holes, the mobility of electrons or holes, etc. While the diodes of the present invention are especially well suited for use in detecting gases and vapors containing these electrically reactive particles they may also be used in conjunction with liquid fluids or solid particles.

In applicant's copending application Serial No. 657,271, filed concurrently herewith and assigned to the same assignee as the present invention, it has been proposed to utilize the above-described phenomena to detect the presence of these gases in the ambient atmosphere surrounding a semiconductor. As pointed out in this prior application, the most consistent and also the most practical method for utilizing the effect of gases and vapor on semiconductors for detection and quantitative determination of gases or vapors is to employ a device having one or more rectifying contacts or junctions between a semiconductor and a metal, or between a semiconductor and another semiconductor of different conductivity or, in general, a device with one or more contacts or junctions between two materials of substantially different conductivities providing rectifying action with respect to passage of electric current. Such a device usually has two terminals and is called a diode. Semiconductors are clasified into N (negative) type and P (positive) type; in the N type semiconductors the majority of current carriers are negatively charged particles, which in germanium and silicon, according to the most accepted theory, are electrons; in the P type semiconductors the majority of current carriers have positive charges, and in germanium and silicon they are the so-called "holes" or localized electron deficiencies. In a germanium or silicon N type diode, rectification of alternating electric current occurs because in one direction of electric current flow, which is called the "forward direction," the current is carried by both the majority carriers (electrons in this case) and minority carriers (holes in this case) across the junction without much resistance, while in the other current direction, called the "reverse or inverse" or sometimes the "back" direction, most of the majority carriers are unable to cross the junction while the minority carriers are crossing it freely. Thus, because the minority carriers are present only in small numbers and also in case of germanium have a lower mobility, the electrical resistance in the reverse direction is much higher than in the forward direction. In diodes formed by contact between an N type semiconductor and a metal, the inverse current direction is the one prevailing when the metal is connected to the negative pole and the semiconductor to the positive pole of a battery; in the "forward direction" the metal is connected to the positive terminal and the semiconductor to the negative terminal. All of the above polarities remain the same when the diode is formed by a junction between a P and an N type semiconductor, the P type taking the place of metal.

Thus far the generally accepted theories agree as to what occurs when rectification is produced by a semiconductor diode. But from here on, and especially as to explaining just why the majority carriers are prevented from crossing the junction when the polarity for the reverse direction is applied, the theories differ. No theory in existence at present is able satisfactorily to account even for all basic facts. Therefore, no further theoretical pictures or explanations shall be given in the present disclosure, and only descriptions of facts as established by experiments of applicant or others will be used except in those instances where the accepted theories can be used to lend understanding to the description.

As explained fully in the copending application referred to above, the sensitivities of the diodes of the present invention are first stabilized by passing a high forward current through a junction or contact between a semiconductor and another semiconductor or metal and, thereafter, the diodes are biased in the reverse direction to perform the measurements first in the presence of a standard gas and then in the presence of an ambient containing electrically reactive particles. The devices of the present invention are basically distinguished by the feature that the action of the ambients tested is concentrated on a junction area with a high density of minority carriers. This in turn creates the following important differences: first, the current carriers must cross a semiconductor layer; due to the presence of the contacting or adjoining other conductors at the point of influence, the semiconductor surface in the vicinity of the contact or junction is charged, thus forming what is termed in some rectification theories a blocking layer; the ambient has to influence only the relatively small area adjacent the diode junction instead of the entire surface area between two ohmic electrodes and the measurement of ambient effect is always performed with the current in the reverse direction using the change in number and mobility of minority carriers.

To provide a device capable of determining the effects of an ambient on a semiconductor device, a few basic considerations are of paramount importance. First, the device itself must be so designed that it possesses a high sensitivity to the ambient; that is, a relatively small change in the ambient produces a relatively large change in one or more of the electrical characteristics of the device being measured. In most of the prior investigations by others, as well as in the early stages of applicant's studies, it was necessary to employ vacuum tube amplifiers to observe the effects of gases and vapors even in high concentrations. Applicant has succeeded in developing gas detectors whereby it is now possible not only to observe the effects of gases and vapors when present in considerable concentrations, but to accurately measure many of them even when present in concentrations of the order of a few parts per million and to do this with ordinary commercial electric meters and relatively simple circuitry without any vacuum tube or other amplifiers, This has been achieved primarily by the development of the special type diodes of the present invention in which high densities of minority carriers are provided at places easily accessible to the gas to be tested. To obtain more energy change for a given gas or vapor concentration the diodes of the present invention employ line or area contacts or joints rather than point contacts, not only because the amount of electrical energy available is thus increased, but also because more mass action of the reactive gas or vapor is obtained due to the fact that more gas has access to the critical surface area of the junction.

A second factor to be considered is that the time required for the semiconductor device to respond to a change in ambient must be short so that the measurements can be made rapidly. By use of the devices of the present invention it is possible to reduce this response time to two minutes or less while in all prior experimentation a period of from five to twenty minutes was required following a change in the ambient in order to produce reproducible measurements. This desirable result has been achieved primarily by the combined effects of using very thin semiconductor coatings, of exposing a relatively large junction area to the ambient so that the electrical characteristics which vary as a result of the change in ambient reach a stable level rather quickly, and allowing the gas or vapor to reach the junction area in a minimum of time. Unless a very thin layer of semiconductor material is employed at the junction, a relatively long time is required for the minority carriers in the immediate vicinity of the junction to reach equilibrium with the minority carriers in the bulk of the semiconductor material below the surface of the junction and the time required to obtain a complete set of measurements is excessive. A thin junction also provides for increased current density when current is passed therethrough in making the measurements and this current density increase results in an increase in the electrical surface state and the sensitivity to ambients. The rapid flow of gas to the junction area to allow equilibrium to be reached quickly is effected, in accordance with the present invention, by delivering gases directly to the interface of the junction or semiconductor with the supporting base member thereby to limit the ambient action to the junction area, the remainder of the semiconductor surface being protected by an insulating jacket.

In view of the foregoing discussion, it will be recognized that the principal object of the present invention is to provide novel semiconductor type diodes for use as devices for detection and measurement of certain components in ambient gases and fluids.

A further object of the present invention is to provide novel semiconductor type diodes which exhibit relatively large changes in one or more electrical characteristics in response to a change in concentration of electrically reactive particles in an ambient atmosphere.

Still another object of the present invention is to provide novel semiconductor type diodes which are sufficiently sensitive to changes in ambient that conventional electrical meters can be employed in measuring changes in electrical characteristics without requiring the use of electronic or other amplifiers.

It is also an object of the present invention to provide novel semiconductor type diodes employing area or line type junctions or contacts having a very thin layer of semiconductor material at the junction, thereby to decrease the time required for reaching an equilibrium condition.

It is likewise an object of the present invention to provide novel semiconductor type diodes for use in fluid detection wherein the ambient action occurs exclusively in the vicinity of the junction area and fluid flows to the junction rapidly in order to reduce the time required for the effects of the ambient to be stabilized.

Briefly, the above and further objects are realized in accordance with the present invention by providing semiconductor diodes formed by an area or line junction between two dissimilar materials in the form of a layer which is very thin at the junction area. Fluids to be detected flow to the underside of the junction, that is, to the interface of the junction and the supporting base, to limit the action of the ambient to the junction area, while the outer surface of the semiconductor is protected from the action of ambients by a fluid-tight jacket or enclosure.

The invention, both as to organization and method of operation, together with further objects and advantages thereof, will best be understood by reference to the following detailed description taken in connection with the accompanying drawings, in which:

Fig. 1 is a greatly enlarged perspective view of a semiconductor device embodying the features of the present invention;

Fig. 2 is a vertical sectional view taken along a line substantially corresponding to line 2—2 of Fig. 1 and shows particularly one of the upright channels of the device shown in Fig. 1 and the junction line on the wall of the channel;

Fig. 3 is a sectional view illustrating another form of diode construction characterized by the features of the present invention;

Fig. 4 is a longitudinal sectional view illustrating another embodiment of the invention;

Fig. 5 is a transverse sectional view taken along a line substantially corresponding to line 5—5 in Fig. 4;

Fig. 6 is a transverse sectional view illustrating another modification of the present invention;

Fig. 7 is a transverse sectional view illustrating a fifth embodiment of the present invention;

Figure 8:
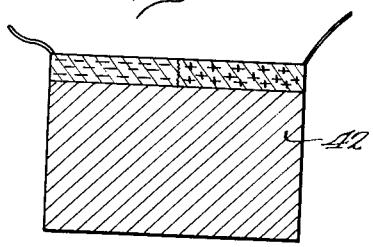
Fig. 8 is a sectional view illustrating one manner in which layers of abutting, semiconductor materials can be formed to provide a thin junction.

The diodes of the present invention are all of the permanent junction type wherein the junction is formed between an N type semiconductor and a P type semiconductor. The two principal semiconductive materials which have been employed are silicon and germanium, but it will be understood that other types of semiconductors may be used. It has been found that the surface states of semiconductors, and particularly silicon and germanium, are considerably affected not only by charged particles such as ions and electrons, but also by polar molecules such as water vapor, alcohol, acetone, etc., and also by those molecules which are easily polarized or ionized by weak electric fields, such as, for example, oxygen, chlorine, fluorine, etc.

A relationship between the rectifying properties of a diode and its sensitivity to vapors and gases has also been found. Thus, whenever a contact between a metal and a semiconductor or, in general, between two conductors of unequal conductivity, has rectifying characteristics, that is, conducts electric current in one direction more easily than in the other, there is also present sensitivity to fluid containing electrically reactive particles; that is, one or more of the electric characteristics determined by application of voltage across the diode to cause current flow in the reverse direction with air or a standard gas as an ambient changes when an ambient containing electrically reactive particles is introduced. However, this relationship is by no means quantitative. On the contrary, elements which have quite poor characteristics as rectifiers often have high sensitivities to gases and vapors and vice versa. For example, some germanium diodes with a ratio of 3 to 1 of forward to reverse current, which are quite worthless as rectifiers, have exhibited very high sensitivity to oxygen, water vapor, alcohol. But in all cases which applicant has thus far encountered, when rectification is entirely absent, sensitivity to gases and vapors is also absent.

Referring now to the drawings, and particularly to Figs. 1 and 2 thereof, the present invention is there illustrated in an arrangement for bringing fluids such as gases or vapors into direct contact with the boundary or junction 22 formed between a P type semiconductor 20 and an N type semiconductor 21. To this end, gas is delivered from a common inlet pipe 23 through a plurality of spaced apart, parallel extending conduits 24, each of which opens to a bore 25 extending across the junction 22 from one side of the semi-conductor materials 20 and 21 to the other. The bores 25 thus extend parallel to each other and are disposed in a plane substantially corresponding to the plane of the junction 22. The lower ends of the bores 25 are connected to conduits 26 which deliver outlet gases to an outlet manifold or pipe 27. The ends of conduits 24 and 26 are joined to semiconductor materials in the vicinity of their associated bores 25 by suitable bonding material indicated at 24a and 26a for providing a fluid or gas-tight seal.

The entire outer surfaces of the semiconductor materials 20 and 21 are covered with an insulating layer 28 such as varnish or plastic which protects the materials. Thus, it is not necessary to provide a separate housing for the rectifier and the entire structure can be made very small. Electrical connections are made to the materials 20 and 21 via conductors 29 and 30, respectively, which engage suitable terminals 31 and 32.

In the construction illustrated in Fig. 1 the ambient action is substantially limited to the area of the junction 22 and a considerable amount of the gas flows through the several bores and is exposed to a relatively large junction area. Thus, the sensitivity of the diode to changes in the concentration of electrically reactive particles in the ambient is high. Moreover, since the gases can reach the large junction area rapidly, an equilibrium condition will be reached quickly. In addition, it will be noted that this construction provides a junction of relatively large area, and, therefore, the electric current capacity of such a diode is relatively high. Thus, this particular embodiment is particularly useful when large power changes from ambients are desired, as, for example, for control purposes.

An arrangement similar to that described above and capable of still higher power output is illustrated in Fig. 3 wherein the bores 25a extend through semiconductors 20 and 21 in a direction normal to the junction 22 and the inlet conduits 24a and outlet conduits 26a project well into the bores. The open end of each inlet conduit is spaced from the open end of its associated outlet conduit so that gas is delivered into the bore 25a in the vicinity of the junction 22. The junction area exposed to the ambient is obviously somewhat less but the rectifying contact area between the semi-conductor parts is considerably larger in the case of the embodiment illustrated in Fig. 3.

In general, when a gas containing the electrically reactive particles described above is admitted to a semiconductor diode biased in the reverse direction, there are two more or less distinct effects: a fast one of the order of a fraction of a second, and a slow one in which equilibrium is reached in two minutes or longer. Applicant ascribes the reason for the slow change to the necessity for the electrons and holes in the interior to adjust themselves to the changed surface condition when the ambient is changed and then in turn influencing the surface condition. Therefore, the smaller the bulk, with respect to the surface, the faster equilibrium will be reached and therefore, when fast response is the principal consideration, thin semiconductor coatings having a thickness of less than 100 microns and as low as 50 microns are preferred in diodes which are to be used as ambient detectors.

Referring now to Figs. 4 and 5, it will be observed that the construction there shown comprises a P type semiconductor material 40 and an N type semiconductor material 41 in the form of thin layers formed on a solid supporting base 42. It will be understood that this base must either be of an insulating material such as quartz, glass or one of the plastics, or at least have a very much higher electric resistance than the junction, in order to avoid a considerable shunting effect. Graphite and carbon have been found satisfactory as a material for these supporting bases, and have the advantage of good machinability. Graphite has the added advantage that thin layers of N type germanium and silicon on graphite are at present already commercially available. When using this material for some of the gas detecting diodes of the present invention, a rectifying junction of the type used in the devices of Figs. 4 to 14 is produced by converting part of the N type layer to P type in a manner described in detail below. The base 42 is illustrated as being in the form of a rectangular block although obviously this base may take any number of forms or shapes. As indicated above, the thickness of the semi-conductor layers at the junction 43 is preferably between 50 and 100 microns.

In any event, a bore 44 in the base 42 accommodates an inlet conduit 45 and an outlet conduit 46 having their inwardly disposed ends spaced apart. In the embodiment of the invention illustrated in Figs. 4 and 5, a tubular member 47 formed entirely of porous material is disposed between the open ends of conduits 45 and 46 to receive the gas flow. The upper edge of the member 47 is exposed directly to the junction 43 as indicated at 48 and, accordingly, gas flows through the porous member 47 directly to the underside of the junction, that is, to the interface between the base 42 and the junction 43, so that the ambient action takes place only at the junction area and the above-described equilibrium condition is reached very quickly following a change in ambient. The outer surface of the semiconductor materials and the base 42 are encased within an insulating jacket or cover preferably formed of plastic material such as bakelite and, as a consequence, the device can again be made extremely small.

In the arrangement shown in Fig. 6, the tubular member 47 includes a portion 47a of porous material exposed to the junction 43, the remainder of the member 47 being formed of metal or other non-porous material. Thus, the gas flowing to the member 47 emerges from the porous portion 47a and flows directly against junction 43 with the beneficial results previously described.

In the arrangement shown in Fig. 7, the tubular member 47 includes a longitudinal elongated slot 47b extending perpendicular to the junction 43, the remainder of the tubular member again being formed of metal or other non-porous material. The gases flow from the inlet conduit through the interior of the tubular member 47 and through the slot 47b to the junction 43 to limit the ambient action to the junction area. To exclude undesired gaseous components present in the inlet gas, the interior of the tubular member 47 may be filled with a granular material which eliminates the component either by absorption or by chemical action. Thus, for example, if it is desired to prevent water vapor in the inlet gases from reaching the junction area, calcium chloride particles may be inserted within the tubular member 47 while chlorine can be eliminated by the use of a mixture of activated carbon and dry soda lime as is well known.

By eliminating certain known gases in the manner described, identification of unknown gases affecting the electrical characteristics of the junction is facilitated.

It is known that quantities as little as one part in $10^{16}$ of some acceptor or donor materials are sufficient to cause profound changes in electrical conductivity, and other electrical characteristics of semiconductors. The immediate junction area is to a high degree protected against such contaminants by the sensitivity standardizing process described in applicant's copending basic application Serial No. 657,271. In the semiconductor devices for fluid detection described in the latter application, which are encased in loose fitting containers, without having the semiconductor surface protected, it is necessary sometimes to employ filters or other special means to prevent contaminants from reaching the semiconductor. The devices of this application, and particularly the embodiments of Figs. 4 to 7, inclusive, provide a high degree of protection against such contaminants in the ambients without any additional means solely by virtue of their tight fitting jackets. Thus, these devices have the additional distinction of being inherently free from effects of contaminants, which might be able to produce temporary or permanent changes in their electrical characteristics.

Figure 12:
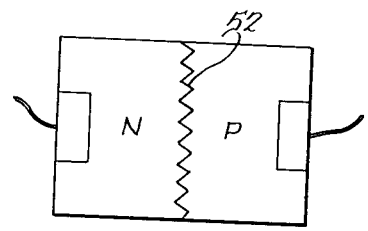
Fig. 12 is a top plan view of the device shown in Fig. 8, assuming that the latter illustrates the entire device.
Figure 14:
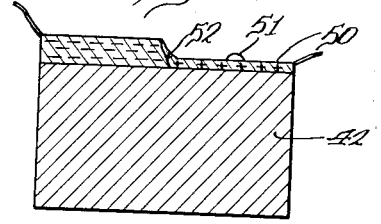

Reference is made now to Figs. 8 to 14 for a consideration of the methods by which the thin semiconductor layers can be formed on the base 42. The desired thinness can be achieved by employing a grown junction diode or a finished diode of the permanent junction type made by any of the processes well known in the art. The junction area can then be thinned by removing a portion of the semi-conductor materials as, for example, by purely mechanical means such as grinding or, if desired, the materials may be removed by chemical means as, for example, by employing a strong solvent solution to dissolve a portion of the materials while the rest of the materials are protected by a masking compound or masking tape. Moreover, electrochemical means known in the art may be used to remove a portion of the layer near the junction. However, the preferred method is to use a wafer of a single type material, for example a wafer of N type germanium, then to reduce a portion of it to a thickness of less than 100 microns (0.1 of a millimeter) at the desired junction area either by the mechanical or electrochemical processes referred to above, and then to convert a portion of the semiconductor material to the opposite type semiconductor, a P type in this case. Thus, as illustrated in Fig. 14 one-half of the wafer may be thinned down as illustrated at 50 and the thinned half may be converted by irradiation by X-rays or by radiation from a nuclear reactor. A simpler method for converting, however, is to place a small quantity of certain metals, known as acceptor materials, such as gold, indium or the like indicated at 51 on the portion to be converted and diffusing it into the semiconductor by quickly melting it while the rest of the specimen is protected by masking or cooling. As illustrated in Fig. 12, the conversion may be so controlled that a zigzag junction indicated at 52 is produced, thus increasing the junction area and, hence, improving the sensitivity of the diode. The thinning down of the wafer can also be performed in the manner illustrated in Fig. 13 where only the center portion indicated at 53 is shown as being removed. The conversion is again performed either by irradiation or by diffusion of gold or indium as described above. Electrical connections to the semiconductor materials are, of course, made in conventional manner.

Figure 9:
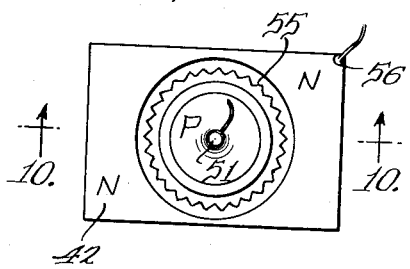
Fig. 9 is a plan view illustrating a particular disposition of the semiconductor layers.
Figure 13:
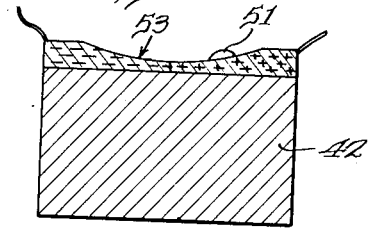
Figs. 13 and 14 are views useful in understanding the manner in which thin layers of semiconductor materials can be formed.
Figure 10:
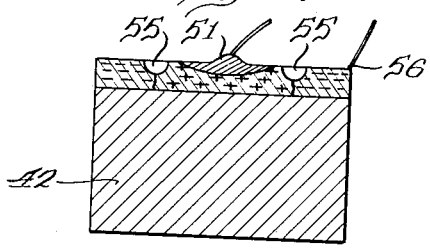
Fig. 10 is a sectional view taken along a line substantially corresponding to line 10—10 in Fig. 9.
Figure 11:
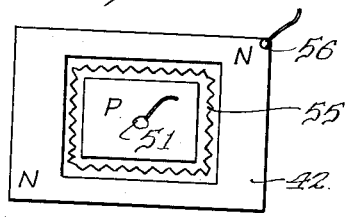
Fig. 11 is a view similar to Fig. 9 but illustrating another disposition of the semiconductor layers.

To increase the junction area, the portion of the wafer converted from N type to P type may be located at or near the center of the specimen as illustrated in Figs. 9, 10 and 11. To control the size and shape of the boundary or junction between the P and N types, a small groove or recess 55 having the desired shape and dimensions is formed in the wafer by grinding. This grinding also serves to thin down the layers of semiconductor materials at the site of the boundary.

The boundary may be circular as shown in Fig. 9 or may be square or rectangular as shown in Fig. 11 and, in addition, to further increase the junction area, the boundary in both of the cases may be in a zigzag shape. The conversion of the center portion is preferably carried out by diffusion of gold or indium in the above-described manner and the small heap of acceptor material remaining at the center may be used to make an ohmic connection to the P type portion of the diode. A suitable electrical connection is also made to the N type material, as indicated at 56. Thus, in all of the arrangements illustrated in Figs. 8 to 14, inclusive, the junction formed has a thickness of only less than 100 microns for the reasons previously described.

While particular embodiments of the invention have been shown and described, it will be understood that many modifications will become readily apparent to those skilled in this art and it is, therefore, intended in the appended claims to cover any such modifications that fall within the true spirit and scope of the invention.

What is claimed as new and desired to be secured by Letters Patent of the United States is:

1. In a fluid detector, a rectifying device comprising a junction formed by intimately contacting portions of two dissimilar materials at least one of which is a semiconductor, a protecting layer of insulating material on the outer surface of said device, and conduit means extending through said layer for delivering fluids to the interior of said layer where they flow to said junction, said protecting layer being impenetrable by said fluids except through said conduit means.

2. In a fluid detector, a rectifying device comprising a junction between two dissimilar materials at least one of which is a semiconductor, said dissimilar materials being formed on a common supporting base member having an electrical conductivity which is lower than that of said junction, so that the backside of the junction between said materials lies adjacent said supporting base member, and means for delivering a fluid to be tested to the backside of said junction.

3. In a gas detector, a rectifying device comprising a junction between two dissimilar materials at least one of which is a semiconductor, said dissimilar materials being formed on a common supporting base member so that the backside of said junction lies adjacent said base, a gas conveying passage in said base member, and means for delivering gases from said passage to the backside of said junction.

4. The structure defined by claim 2 wherein said base is formed of porous material and said fluid is delivered to the interior of the base member to flow through the porous material to the backside of said junction.

5. The structure defined by claim 3 wherein the base is formed of porous material and the gas conveying passage extends in a direction generally normal to said junction so that the gas in the passage flows through the porous material to the backside of said junction.

6. The structure defined by claim 3 wherein the base member is formed of porous material and the gas conveying passage extends generally parallel to the plane of said junction so that the gas flows through the porous material to the backside of the junction.

7. The structure defined by claim 3 wherein the gas conveying passage is formed by a tubular member embedded in and extending at least partially through the base member.

8. The structure defined by claim 3 wherein the dissimilar materials are formed on a single plane surface of said base member and said gas conveying passage comprises a tube extending through the base member and normal to said junction.

9. The structure defined by claim 7 wherein said tubular member includes a portion of porous material exposed to said junction to permit gas to flow to the backside of the junction.

10. The structure defined by claim 7 wherein said tubular member includes an elongated, longitudinal opening therein adjacent said junction in order to permit the flow of gas through the opening to the backside of the junction.

11. The structure defined by claim 7 wherein said tubular member is formed of porous material.

12. The structure defined by claim 1 wherein said dissimilar materials comprise a P type semiconductor and an N type semiconductor.

13. The structure defined by claim 2 wherein said dissimilar materials comprise a P type semiconductor and an N type semiconductor.

14. The structure defined by claim 3 wherein said dissimilar materials comprise a P type semiconductor and an N type semiconductor.

15. The structure defined by claim 7 wherein said dissimilar materials comprise a P type semiconductor and an N type semiconductor.

16. The structure defined by claim 8 wherein said tubular member comprises a strip of porous material exposed to said junction, the remainder of said tubular member being formed of non-porous material.

17. The structure defined by claim 2 wherein the dissimilar materials are in the form of a coating on said base member and have a thickness of less than 100 microns at said junction.

18. The structure defined by claim 17 wherein said dissimilar materials comprise a P type semiconductor and an N type semiconductor.

19. The structure defined by claim 3 wherein said dissimilar materials are in the form of a coating on said base member and have a thickness of less than 100 microns at said junction.

20. The structure defined by claim 19 wherein said dissimilar materials comprise a P type semiconductor and an N type semiconductor.

21. In a gas detector, a rectifying device comprising a supporting base member, a coating adhering to the surface of said base member and consisting of a P type semiconductor and an N type semiconductor cooperating to form a rectifying junction, the thickness of said coating at said junction being less than 100 microns.

22. The structure defined by claim 21 wherein said base member is formed of graphite.

23. The structure defined by claim 21 wherein said base member is formed of porous material and additionally includes gas conveying means for directing gases to the interior of the base member from where it flows through said porous material to said junction.

24. In an ambient detector, a rectifying device comprising a junction formed by intimately contacting portions of two dissimilar materials at least one of which is a semiconductor, an enclosure of insulating material surrounding said device, and conduit means for delivering an ambient to the interior of said enclosure for passage to said junction and for removing said ambient from the interior of the enclosure, said enclosure being impenetrable by said fluid except through said conduit means.

25. In a detector of components in a fluid, a rectifying device comprising a junction formed by intimately contacting portions of two dissimilar materials at least one of which is a semiconductor, a protecting layer of insulating material on the outer surface of said device, means defining at least one cavity internally of said device in fluid communication with at least part of the junction, and conduit means extending through said layer for delivering fluids directly to said cavity by positive flow and for removing fluids from said cavity so that the detachable components are passed substantially to the junction part only of the rectifying device.

26. The structure defined by claim 25 wherein said dissimilar materials comprise a P-type semiconductor and an N-type semiconductor.

27. The structure defined by claim 25 wherein the cavity is defined by walls formed partly by one of said dissimilar materials and partly by the other of said dissimilar materials.

28. In a fluid detector, a rectifying device comprising a junction formed by intimately contacting portions of two dissimilar materials, at least one of which is a semiconductor, an enclosure of insulating material surrounding said device, means defining a cavity internally of said device and in fluid communication with at least part of said junction, and means for delivering fluid directly to said cavity by positive flow and for removing the fluid from said cavity by positive flow.

29. The structure defined by claim 28 wherein the cavity is defined by walls formed partly by one of said dissimilar materials and partly by the other of said dissimilar materials.

30. The structure defined by claim 21 wherein said base member is formed of material having a resistance substantially higher than that of said junction in the reverse direction.

References Cited in the file of this patent

UNITED STATES PATENTS

| | | |
|---|---|---|
| 2,402,662 | Ohl | June 25, 1946 |
| 2,711,511 | Pientenpol | June 21, 1955 |

UNITED STATES PATENT OFFICE
CERTIFICATE OF CORRECTION

Patent No. 2,975,362　　　　　　　　　　　　　　March 14, 1961

Moses G. Jacobson

It is hereby certified that error appears in the above numbered patent requiring correction and that the said Letters Patent should read as corrected below.

Column 10, lines 19 and 20, for "detachable" read -- detectable --.

Signed and sealed this 19th day of September 1961.

(SEAL)
Attest:

ERNEST W. SWIDER
Attesting Officer

DAVID L. LADD
Commissioner of Patents

USCOMM-DC